United States Patent
Parampottil

(10) Patent No.: US 10,735,687 B1
(45) Date of Patent: Aug. 4, 2020

(54) ON-DEMAND CONTROLLED-ENVIRONMENT FACILITY RESIDENT ELECTRONIC COMMUNICATION RECORDING

(71) Applicant: Securus Technologies, Inc., Carrollton, TX (US)

(72) Inventor: Isaac Parampottil, Coppell, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 16/452,207

(22) Filed: Jun. 25, 2019

(51) Int. Cl.
- *H04N 5/76* (2006.01)
- *H04N 7/14* (2006.01)
- *H04M 3/42* (2006.01)
- *G06F 9/451* (2018.01)

(52) U.S. Cl.
CPC ............ *H04N 5/76* (2013.01); *G06F 9/451* (2018.02); *H04M 3/42221* (2013.01); *H04N 7/141* (2013.01)

(58) Field of Classification Search
USPC .......................................... 348/14.01–14.09
See application file for complete search history.

(56) References Cited

U.S. PATENT DOCUMENTS

| | | | | |
|---|---|---|---|---|
| 5,710,591 A * | 1/1998 | Bruno | ............... | H04M 3/42221 348/14.06 |
| 9,736,428 B1 * | 8/2017 | Edwards | ................. | H04M 3/56 |
| 2006/0023675 A1 * | 2/2006 | Karaoguz | ......... | H04M 3/42221 370/338 |
| 2008/0285588 A1 * | 11/2008 | Balk | ....................... | H04L 51/34 370/466 |
| 2011/0287810 A1 * | 11/2011 | Zelber | ................... | H04M 1/575 455/566 |
| 2013/0191299 A1 * | 7/2013 | Hermsdorff | ........ | G06Q 10/1053 705/321 |
| 2013/0263227 A1 * | 10/2013 | Gongaware | ............. | H04L 63/08 726/4 |
| 2014/0218466 A1 * | 8/2014 | Bloms | .................... | H04N 7/152 348/14.09 |
| 2016/0330254 A1 * | 11/2016 | Shekh-Yusef | ....... | H04L 65/4061 |

* cited by examiner

*Primary Examiner* — Maria El-Zoobi
(74) *Attorney, Agent, or Firm* — Fogarty LLP

(57) ABSTRACT

In a controlled-environment facility resident on-demand controlled-environment facility resident electronic communication recording system and/or method, a controlled-environment facility secure communication platform, or the like, accepts initiation of an electronic communication involving a resident of a controlled-environment facility and establishes an electronic communication link between the resident and another call party. A controlled-environment facility communication and/or media device, or the like enables the resident to participate in the electronic communication, such as via a user interface provided on the controlled-environment facility communication and/or media device, and presents, such as via the user interface provided on the controlled-environment facility communication and/or media device, an option to the controlled-environment facility resident to record at least a portion of the electronic communication, such as via user interface provided on a controlled-environment facility communication and/or media device.

17 Claims, 3 Drawing Sheets

ON-DEMAND CONTROLLED-ENVIRONMENT FACILITY RESIDENT ELECTRONIC COMMUNICATION RECORDING

TECHNICAL FIELD

This specification is generally related to electronic communications by residents of controlled-environment facilities, and specifically related to recording at least a portion of such controlled-environment facility resident electronic communications, by the controlled-environment facility resident, on demand.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which facilitate controlled-environment facility resident on-demand controlled-environment facility resident electronic communication recordings. Therein, a controlled-environment facility secure communication platform, or the like, accepts initiation of an electronic communication involving a resident of a controlled-environment facility and establishes an electronic communication link between the resident and another call party. A controlled-environment facility communication and/or media device, or the like enables the resident to participate in the electronic communication, such as via a user interface provided on the controlled-environment facility communication and/or media device, and presents, such as via the user interface provided on the controlled-environment facility communication and/or media device, an option to the controlled-environment facility resident to record at least a portion of the electronic communication.

The controlled-environment facility secure communication platform and/or the controlled-environment facility communication and/or media device, or the like, saves a recording of at the (portion of the) electronic communication, in response to selection, by the resident of the option to record (a portion of) the electronic communication by the resident via a user interface provided on the controlled-environment facility communication and/or media device.

The controlled-environment facility secure communication platform and/or the controlled-environment facility communication and/or media device, or the like, confirms, prior to establishing the electronic communication link between the controlled-environment facility resident and the other call party, that the resident is authorized to participate in the electronic communication, and further confirms, prior to presenting the option to the controlled-environment facility resident to record at least the portion of the electronic communication, that the resident is authorized to record (the portion of) the electronic communication.

The controlled-environment facility communication and/or media device, or the like, presents the option to record the (portion of the) electronic communication, via the user interface provided on the controlled-environment facility communication and/or media device, prior to the controlled-environment facility secure communication platform establishing the electronic communication link between the controlled-environment facility resident and the other call party.

Where the electronic communication is an audio communication, selection of the option to record the electronic communication may result in the controlled-environment facility secure communication platform and/or the controlled-environment facility communication and/or media device, or the like, recording audio of the (portion of the) electronic communication.

Where the electronic communication is a video visitation, selection of the option to record the electronic communication may result in the controlled-environment facility secure communication platform and/or the controlled-environment facility communication and/or media device, or the like, recording video of the (portion of the) electronic communication. Alternatively, or additionally, where the electronic communication is a video visitation, the controlled-environment facility communication and/or media device, or the like, may present, via the user interface provided on the controlled-environment facility communication and/or media device, one option to record the video of the video visitation, including audio of the video visitation, and another option to record an audio portion of the video visitation, alone. The controlled-environment facility secure communication platform and/or the controlled-environment facility communication and/or media device, or the like, may present the one option to record the video of the video visitation, including audio of the video visitation, and/or another option to record an audio portion of the video visitation, alone, based, at least in part on further confirming that the resident is authorized to record the video audio and/or audio of the at least a portion of the electronic communication.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
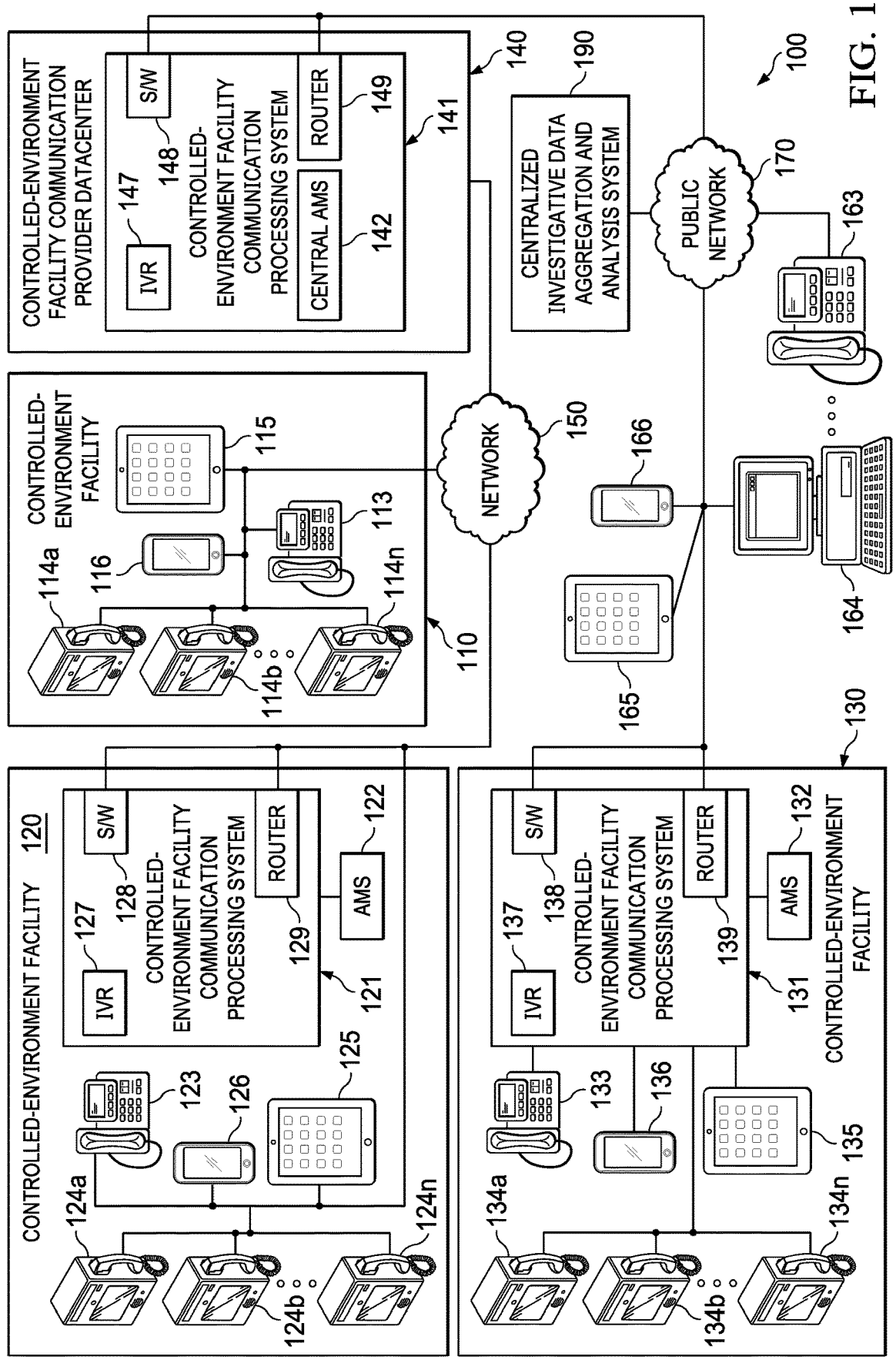
Figure 2:
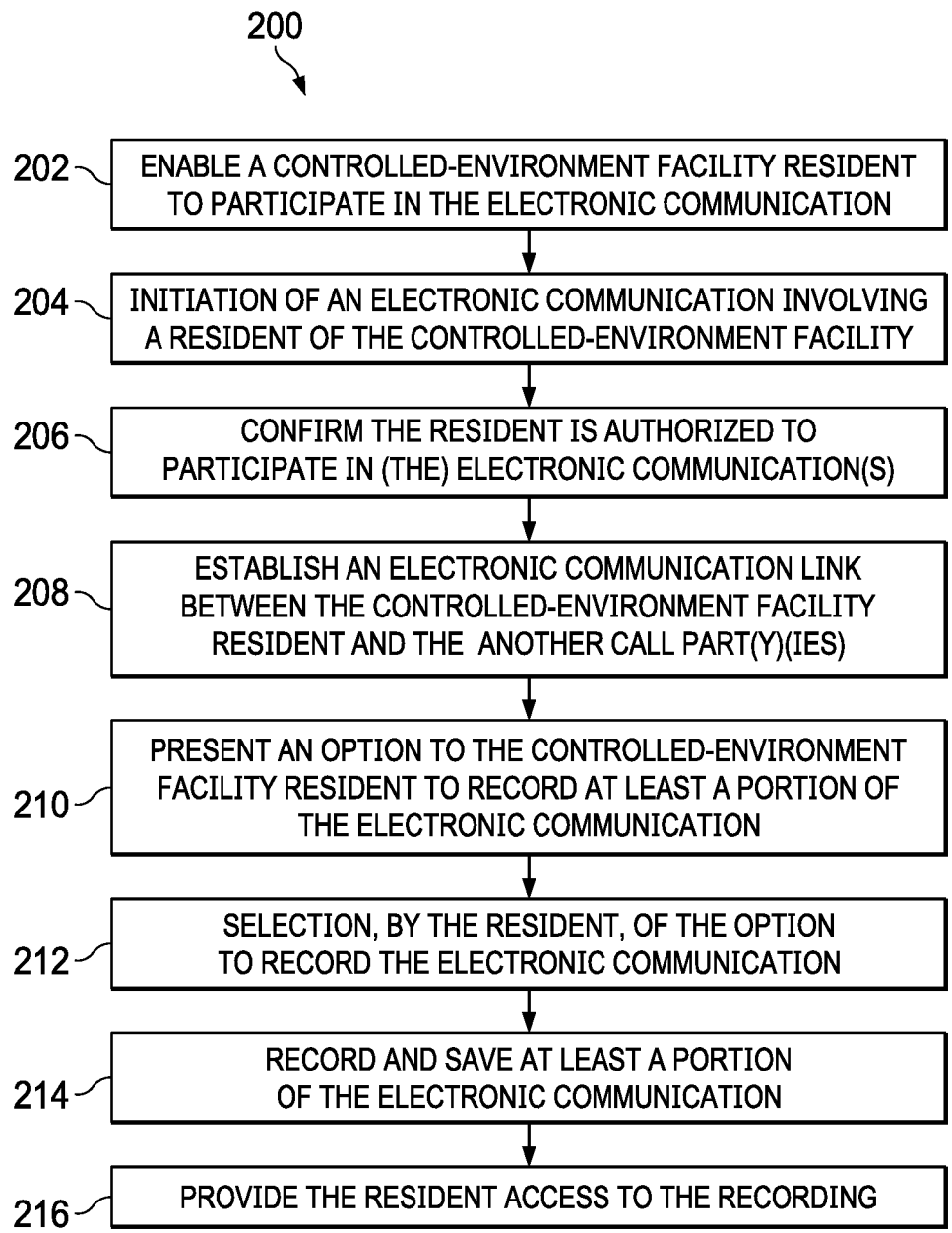
Figure 3:
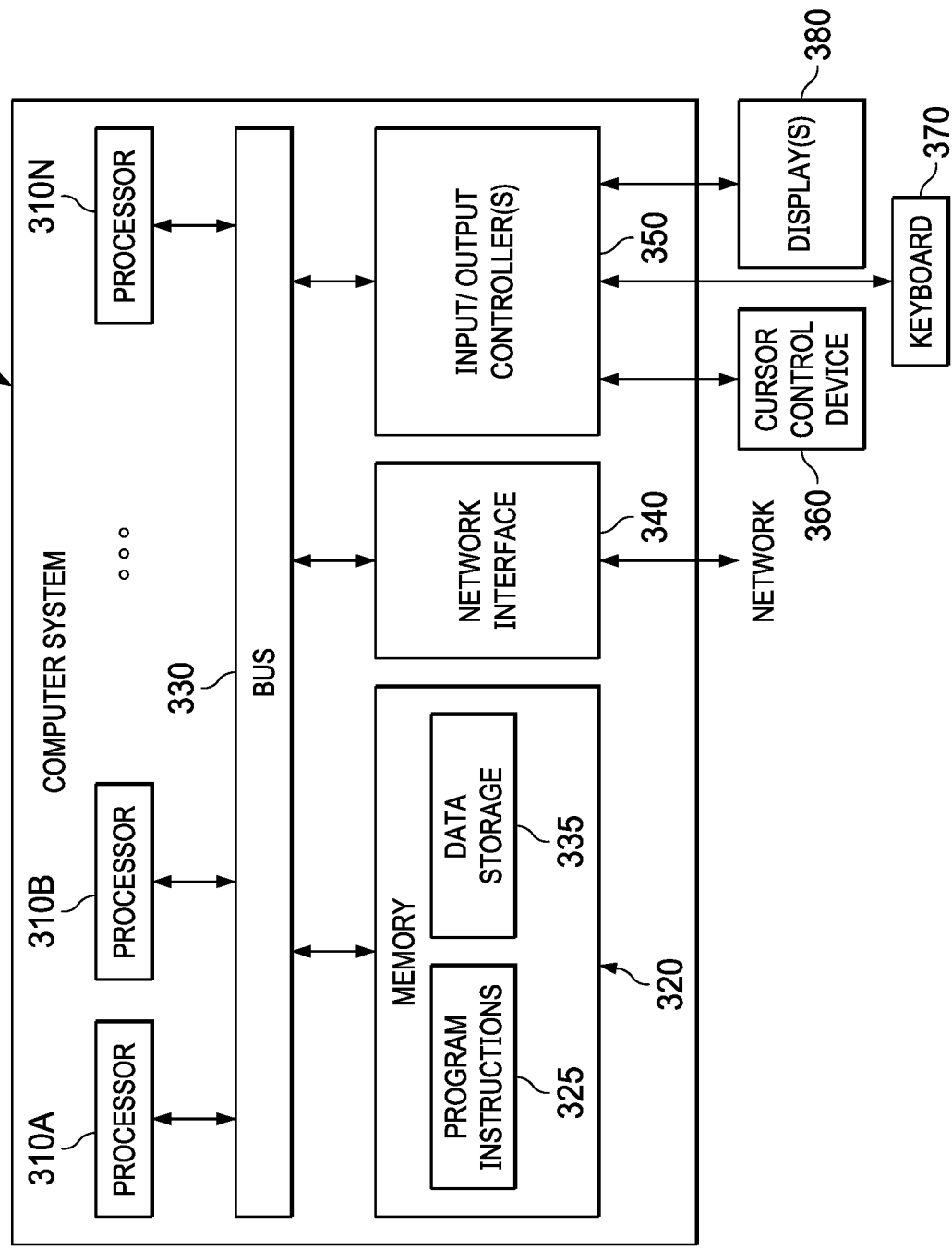

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for on-demand controlled-environment facility resident electronic communication recording may be employed (in conjunction with a plurality of controlled-environment facilities), according to some embodiments;

FIG. 2 is a flowchart of an example implementation of on-demand controlled-environment facility resident electronic communication recording by a controlled-environment facility resident, in accordance with some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods relate generally to electronic communications by residents of controlled-environment facilities. Controlled-environment facility residents (correctional facility imamates) typically have no ability to capture (e.g. record (key moments during) such electronic communications. Hence, embodiments of the present systems and methods are specifically directed to recording at least a portion of such controlled-environment facility resident electronic communications, by the resident, on demand. Typically, an inmate cannot record and keep a call with their loved one. Controlled-environment facilities control what can be recorded, whether a phone call or video visitation. However, those recordings are not typically made available to the inmate (resident). Embodiments of the present systems and methods allow inmates (residents) to record and keep special moments. That is, in accordance with embodiments of the present controlled-environment facility resident on-demand controlled-environment facility resident electronic communication recording system and/or method, a controlled-environment facility secure communication platform, or the like, accepts initiation of an electronic communication involving a resident of a controlled-environment facility and establishes an electronic communication link between the resident and another call party. A controlled-environment facility communication and/or media device, or the like enables the resident to participate in the electronic communication, such as via a user interface provided on the controlled-environment facility communication and/or media device, and presents, such as via the user interface provided on the controlled-environment facility communication and/or media device, an option to the controlled-environment facility resident to record at least a portion of the electronic communication, such as via user interface provided on a controlled-environment facility communication and/or media device.

Thereby, embodiments of the present systems and methods allow a controlled-environment facility resident (inmate) to record, and keep a special audio call with friends and family. This can be a special call with a child, parent, or grandparent. Additionally, embodiments of the present systems and methods, allow inmates (controlled-environment facility residents) to record video visitations in MPEG4 format, or the like, that they would consider important or special such as a baby's first step, baby's first words, a special birthday or last moments with parents or grandparents, etc.

FIG. 1 is a diagrammatic illustration of example communications environment 100, wherein an example embodiment of the present systems and methods for on-demand controlled-environment facility resident electronic communication recording may be employed, for example with respect to multiple controlled-environment facilities 110, 120, etc., and/or a single controlled-environment facility (130), in accordance with some embodiments. Therein, onsite communication processing system 121, 131, external centralized communication processing system 141, such as may be deployed in a controlled-environment facility communications provider data center (140), or the like may provide telephone services, videoconferencing, online chat, e-messaging, and other communication services to residents of respective controlled-environment facility 110, 120, 130, etc. As illustrated, in some cases, a communication processing system (121, 131) may be co-located with a controlled-environment facility (120, 130, respectively). Alternatively, as also illustrated, a communication processing system (141) may be centrally or remotely located, such as in controlled-environment facility communications provider data center 140 in whole (such as with respect to facility 110) or in part (such as with respect to facility 120). Controlled-environment facility communications provider data center 140, and hence external centralized communication processing system 141, may be connected to such facilities via a public network (e.g. the Internet) or a private network, or the like (e.g. via a secure tunneling protocol over the internet, using encapsulation) (150) and may provide communication services to such multiple controlled-environment facilities. Such controlled-environment facility communication processing systems, particularly when deployed in, or in conjunction with, a controlled-environment facility communications provider data center (140), and/or in conjunction with onsite Administration Management System (AMS) 122, 132 (or a Jail Management System (JMS) in correctional environment embodiments), and/or external centralized AMS 142, may be referred to as a "controlled-environment facility secure communication platform," or the like. More generally, however, it should be noted that communication systems 121, 131, 141, etc. may assume a variety of forms, comprising, including and/or embodying telephony switches, such as electronic switching systems, or the like, and/or and may be configured to serve a variety of facilities and/or users, whether within, or outside of, the respective controlled-environment facility.

Onsite AMS 122, 132 (or a Jail Management System (JMS) in correctional environment embodiments), and/or external centralized AMS 142 may be employed in accordance with various embodiments of the present systems and methods. In other embodiments, where the (central) controlled-environment facility communication system (141) is located remotely with respect to the controlled-environment facility (110, 120, etc.), access to AMS (or JMS) 122, 132, etc. may (also) be obtained via a computer network such as, for example, network 150. In various embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity). In accordance with embodiments of the present systems and methods, controlled-environment facility AMS 122, 132, etc. (e.g. a JMS with respect to correctional facilities), associated with at least one controlled-environment facility 120, 130 may maintain information with respect to the residents of the respective controlled-environment facility. An external remote AMS (142) may maintain information with respect to residents of one or more controlled-environment facilities (e.g. 110, 120). In the context of a correctional facility, the respective JMS or AMS databases may include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings made by the facility, or in accordance with present systems and methods; known or suspected gang or criminal affiliations; known or suspected affiliates, accomplices, or gang members; and any other information that may be relevant or useful to correctional facility staff to house and maintain inmates.

In accordance with various embodiments of the present systems and methods, the resident may be charged for viewing his or her recordings, saved in accordance with embodiments of the present systems and methods, as described in greater detail below, charged for maintaining the recordings in storage, charged for obtaining copies of the recordings (such as for sharing with friends or family members, after or upon release from the controlled-environment facility, etc.), or the like. Charges for such services may be debited from resident accounts discussed above, maintained by AMS 122, 132 and/or 142. In the case of maintaining storage of the recording, such charges may be periodically debited from such a resident account maintained by AMS 122, 132 and/or 142. Access to saved recordings, and/or the ability to maintain such recordings, may be limited based on a disciplinary status, account status, or the like, of the resident, maintained by AMS 122, 132 and/or 142, in accordance with various embodiments of the present systems and methods.

In some implementations, wherein the controlled-environment facility communication system (121, 131) is located within the controlled-environment facility (120, 130), it may have direct access to a respective AMS (122, 132). In addition to providing certain visitation and communication operations, communication processing systems 121, 131, 141, etc. and/or AMS (or JMS) 122, 132, 142, etc.

may attempt to ensure that a resident's calls, video conferences, online chats, e-messaging, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 122, 132 or 142, or the like. In addition to PAN or PAC list(s), AMS (or JMS) 122, 132 or 142 (databases), or the like, may also store inmate or resident profile data (RPD), as well as visitation rules applicable to each inmate or resident, Communication Detail Records (CDRs), or similar records, for resident phone calls, video visitations, texts, online chats, e-messaging, or the like.

Residents may use more-or-less conventional telephones 113, 123, 133, or the like to access certain communication services, under control of respective communication processing system 121, 131, 141, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use an intelligent controlled-environment facility media and/or communications terminal 114a through 114n, 124a through 124n, 134a through 134n, or the like, to place voice calls, as well as for video visitation, under control of respective communication processing system 131, 141, etc. Such an intelligent controlled-environment facility media and/or communications terminal may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent controlled-environment facility resident media and/or communications device, Intelligent Resident Device (IRD), or the like, and in a correctional institution embodiment, as an intelligent inmate media and/or communications device Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 121, 131, 141, etc. IRDs 114a through 114n, 124a through 124n, 134a through 134n, IFDs 114, 124, 134, or other similar devices, may be referred to collectively or individually as "(a) controlled-environment facility communication and/or media device(s)," or the like.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are generally illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IRDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, such an IRD may be "stripped-down," particularly from the standpoint of what apps are provided or allowed on the IRD, and/or connectivity afforded to the IRD. By way of example, such an IRD may employ an operating system kernel that has been rebuilt for use in such a tablet computing device in a controlled-environment facility. As a further example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility, for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on an IRD might include apps of particular interest to residents of the controlled-environment facility. For example, an IRD provided to inmates of correctional facilities, might include apps that may be of particular use to an inmate, in general, such as access to a legal research service, or of more specific interest, such as providing an inmate nearing release, access to employment searching apps or the like. Hence, such IRDs may be used to help soon to be released inmates' transition. For example, the IRD may be used to communicate with a future employer, or the like. As such, IRDs may be sponsored, or otherwise subsidized by organizations or companies, assisting with the transition of inmates into society. As noted, in accordance with embodiments of the present systems and methods, IRDs may be used to communicate with others, such as through phone calls, video calls, or the like.

For a resident to initiate an outgoing communication, the resident may initiate telephone services by lifting the receiver on telephone 113, 123,133, etc. or IFD 114, 124, 134, etc. and/or otherwise initiating a call, such as by launching an app on IRD 115, 125, 135, 116, 126, 136, etc. At which time, the resident may be prompted to provide a PIN, other identifying information or biometrics. Interactive voice response (IVR) unit 127, 137 or 147, which may be integrated into communications processing system 121, 131 and/or 141, as illustrated, may generate and play a prompt or other messages to the resident. Under the control of communication processing system 121, 131 and/or 141, etc. the device may be capable of connecting with a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Telephony switches 128, 138, 148 etc. in respective communication processing system 121, 131, 141, etc. may be used to connect calls across a PSTN (i.e. network 170), such as calls from controlled-environment facility telephone 113, 123 or 133 and non-resident telephone 163, which, in accordance with embodiments of the present systems and methods, may also be camera-enabled. Telephony router 129, 139, 149, etc., media gateway functionality, or the like of respective communication system 121, 131, 141, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect controlled-environment facility 110, 120, 130, etc., itself.

Centralized investigative data aggregation and analysis system 190 may provide investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information. Resident recordings made in accordance with embodiments of the present systems and methods, as described in greater detail below, may be employed by centralized investigative data aggregation and analysis system 190 for investigative purposes. For example, not only may the recordings themselves be reviewed and/or monitored for investigative content, but metadata-type information may be gleaned by the centralized investigative data aggregation and analysis system (in an automated manner), based on, for example, what the inmate (resident) viewed as important enough to record, etc. Such investigational activity may result in an alert being sent to an investigator based on various aspects of what, when, who, etc. is recorded by the resident (inmate).

Embodiments of the present systems and methods may be employed in the above-described environment, such as in a manner described below, with respect to FIG. 2, a flowchart of example implementation 200 of on-demand controlled-environment facility resident electronic communication recording by a controlled-environment facility resident. Therein, at 202, a controlled-environment facility resident is enabled to participate in an electronic communication. For example, a controlled-environment facility communication and/or media device (IRD 114, 124 or 134 or IFD 114, 124 or 134), or the like, may provide a user interface on the controlled-environment facility communication and/or media device, at 202, which may be used by the controlled-environment facility resident to participate in electronic communications. At 204, a controlled-environment facility secure communication platform (controlled-environment facility communication processing system 121, 131 and/or 141, and in some embodiments, controlled-environment facility AMS 122, 132 and/or 142), or the like, accepts or receives initiation of an electronic communication involving a resident of a controlled-environment facility. Initiation of the electronic communication may be carried-out by a controlled-environment facility resident, as described above and/or may be initiated via the user interface on the controlled-environment facility communication and/or media device, or the like. Alternatively, the communication may be initiated, at 204, by a non-resident, such as through scheduling of a video visitation, initiating an inbound call to the resident's controlled-environment facility communication and/or media device, or the like.

The controlled-environment facility secure communication platform, the controlled-environment facility communication and/or media device, and/or the like may confirm, or otherwise validate, at 206, such as prior to establishing the electronic communication link between the controlled-environment facility resident and the other call party at 208, or at another time such as a part of communication initialization (at 204), that the resident is authorized, or, to participate in the electronic communication. This determination that the resident is authorized, or otherwise permitted, to participate in electronic communications (of a particular type) in general, and/or in the particular electronic communication being initiated (e.g. in electronic communications (of the type being initiated) with the other call party (or parties)). As noted, at 208, the a controlled-environment facility secure communication platform, or the like, establishes an electronic communication link between the controlled-environment facility resident and another call party. This other call party may be a non-resident, with respect to the controlled-environment facility, or may, in accordance with some embodiments of the present systems and methods, be a resident of another, or the same, controlled-environment facility.

At 210 the resident is presented an option, via the user interface provided on the controlled-environment facility communication and/or media device, or the like, to record at least a portion of the electronic communication. Some embodiments may, beyond confirming that the resident is authorized, or otherwise permitted, to participate in the electronic communication at 208, further confirm, or otherwise validate, prior to, or as a part of, presenting the option to the controlled-environment facility resident at 210, that the resident is authorized, or otherwise permitted, to record the electronic communication, or the like. Besides being limited with respect to disciplinary reasons or an ability to pay for the recording (and/or its storage), inmates (residents) may not be allowed to record certain calls, such as attorney calls, or the like (so that recordings of privileged communications are not in possession of the correctional facility, government, etc.).

The controlled-environment facility communication and/or media device, or the like, may present the option to record at least a portion of the electronic communication, via the user interface, at 210, after the controlled-environment facility secure communication platform, or the like, establishes the electronic communication link between the controlled-environment facility resident and the other call party at 208. However, conversely, in some embodiments the controlled-environment facility communication and/or media device, or the like, may present the option to record the electronic communication, via the user interface (similar to 210), prior to the controlled-environment facility secure communication platform establishing the electronic communication link between the controlled-environment facility resident and the other call party at 208. In any case some embodiments of the present systems and methods, may provide the resident one or more further options (which may be configurable by the controlled-environment facility, communications service provider, or the like) to set that a portion (e.g., 1 minute, 3 minutes etc.) or the whole call is recorded. Such further option(s) may also be provided, via the user interface.

In cases where the electronic communication is an audio communication, selection of the option to record the electronic communication at 212, results in controlled-environment facility secure communication platform, the controlled-environment facility communication and/or media device, and/or the like, recording audio of at least a portion of the electronic communication. Whereas, in situations where the electronic communication is a video visitation, or the like, selection of the option to record the electronic communication at 212 results in the controlled-environment facility secure communication platform, the controlled-environment facility communication and/or media device, and/or the like, recording video of at least a portion of the electronic communication, which will, as discussed above, in general, include audio.

However, in some implementations of the present systems and methods where the electronic communication is a video visitation, or the like, the controlled-environment facility communication and/or media device, or the like, may, at 210, present, via the user interface provided on the controlled-environment facility communication and/or media device, or the like, one option to record video of the video visitation, including audio of the video visitation, and another option to record only an audio portion of the video visitation. Further, similarly, presentation of (a) recording option(s) at 210 of one option to record the video of the video visitation, including audio of the video visitation, or only another option to record only an audio portion of the video visitation, may be based, at least in part on further confirming that the resident is authorized, or otherwise permitted, to record the video, or only authorized, or otherwise permitted, to record audio of (the) electronic communication (s) (in general).

Further, in the case of audio controlled-environment facility resident communication, such as may be carried out without the use of a user interface on a on controlled-environment facility communication and/or media device, voice prompts, or the like, may be provided, such as by an IVR (127, 137 or 147) to provide a resident an option to record all or part of a call. Such prompts may be provided before, during, or even in some embodiments, after the call. For example, the resident may be told, prior to the call being connected (at 208) that they can begin recording of the call at any time during the call by pressing a particular series of buttons on the phone (i.e. to provide DTMF signaling).

Regardless, the controlled-environment facility secure communication platform, the controlled-environment facility communication and/or media device, and/or the like saves a recording of at least a portion of the electronic communication, at 214, in response to selection, by the resident, at 212, of the option offered at 210 to record the electronic communication, for later access by the resident, at 216. Such access may be provided, at a later time, via the user interface provided on the controlled-environment facility communication and/or media device, or the like. However, the recording may be subject to review (and approval), by facility personnel, or in an automated matter, for inappropriate content, or the like, before the resident can view the content at 216. In accordance with various embodiments of the present systems and methods, the resident may be charged for viewing the saved recording, maintaining the recording in storage, obtaining a copy of the recording (such as for sharing with friends or family members, after or upon release from the controlled-environment facility, etc.), or the like. Charges for such services may be debited from resident accounts discussed above. In the case of maintaining storage of the recording, such charges may be periodically debited from such a resident account. Access to saved recordings, and/or the ability to maintain such recordings, may be limited based on a disciplinary status, account status, or the like, of the resident, in accordance with various embodiments of the present systems and methods.

Consistent with the above, limitations may be imposed (by the controlled-environment facility, communications service provider, or the like) on the number of recordings an inmate (resident) may make over a period of time (e.g., one per week, one per day, etc.). Additionally, or alternatively, storage limits may be imposed (by the controlled-environment facility, communications service provider, or the like), such that the resident (inmate) may have to manage storage limits (e.g. delete some recordings before they can save more). Such limitations on the number of recording and/or storage capacity may, in accordance with embodiments of the present systems and methods, may be based, at least in part on a privilege status of the inmate (controlled-environment facility resident), such as may be maintained by controlled-environment facility AMS (JMS) (122, 132, etc.).

Additionally, (or alternatively) such recording may be employed by a centralized controlled-environment facility investigative data aggregation and analysis system (190), or the like for investigative purposes. For example, not only may the recordings themselves be reviewed and/or monitored for investigative content, but metadata-type information may be gleaned by centralized investigative data aggregation and analysis system (190), based on, for example, what the inmate (resident) viewed as important enough to record, etc.

Embodiments of the present systems and methods for recording at least a portion of the controlled-environment facility resident (inmate) electronic communications (voice, video, etc.), by the controlled-environment facility resident (inmate), on demand, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as, or as part of, one or more of: AMSs 122, 132 and 142; controlled environment facility communications management systems 121, 131 and/or 141; centralized investigative data aggregation and analysis system 190; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via a network. For example, in FIG. 1, centralized investigative data aggregation and analysis system 190 is illustrated as communicating with controlled-environment facility communications management systems 121, 131 and 141, via public network 170, which may be the Internet, or the like, as discussed above. Further, users of the present investigative data aggregation and analysis system may communicate therewith via public network 170 (e.g. the Internet) or the like. Likewise, as another example, devices 125 and 135 may communicate with respective controlled-environment facility management systems 121 and 131, such as via a local area network, and/or using wireless functionality.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 through 3. Program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

A person of ordinary skill in the art will appreciate that computer system 300 is merely illustrative and is not intended to limit the scope of the disclosure described herein. The computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident on-demand controlled-environment facility resident electronic communication recording system comprising:

a controlled-environment facility secure communication platform comprising at least one processor and a memory coupled to the at least one processor and storing program instructions thereupon, which when executed by the at least one processor, cause the controlled-environment facility secure communication platform to:
- accept initiation of an electronic communication involving a resident of a controlled-environment facility;
- determine whether the resident is authorized to participate in the electronic communication;
- establish, in response to a determination the resident is authorized to participate in the electronic communication, an electronic communication link between the controlled-environment facility resident and another call party; and
- determine whether the resident is authorized to record at least a portion of the electronic communication;

a controlled-environment facility communication and/or media device comprising at least one processor and a memory coupled to the at least one processor and storing program instructions thereupon, which when executed by the at least one processor, cause the controlled-environment facility communication and/or media device to:
- enable the resident to participate in the electronic communication, via a user interface provided on the controlled-environment facility communication and/or media device; and
- present, in response to a determination that the resident is authorized to record at least a portion of the electronic communication, and option, via the user interface provided on the controlled-environment facility communication and/or media device, to the controlled-environment facility resident to record at least a portion of the electronic communication.

2. The system of claim 1, wherein the electronic communication is an audio communication and selection of the option to record the electronic communication results in the program instructions of the controlled-environment facility secure communication platform and/or the controlled-environment facility communication and/or media device recording audio of the at least a portion of the electronic communication.

3. The system of claim 1, wherein the electronic communication is a video visitation and selection of the option to record the electronic communication results in the program instructions of the controlled-environment facility secure communication platform and/or the controlled-environment facility communication and/or media device recording video of the at least a portion of the electronic communication.

4. The system of claim 1, wherein the electronic communication is a video visitation and the program instructions of the controlled-environment facility communication and/or media device further cause the controlled-environment facility communication and/or media device to present, via the user interface provided on the controlled-environment facility communication and/or media device, one option to record the video of the video visitation, including audio of the video visitation, and another option to record an audio portion of the video visitation, alone.

5. The system of claim 1, wherein the program instructions of the controlled-environment facility communication and/or media device further cause the controlled-environment facility communication and/or media device to present the option to record the at least a portion of the electronic communication, via the user interface provided on the controlled-environment facility communication and/or media device, prior to the controlled-environment facility secure communication platform establishing the electronic communication link between the controlled-environment facility resident and the other call party.

6. The system of claim 1, wherein the program instructions of the controlled-environment facility secure communication platform and/or the controlled-environment facility communication and/or media device further cause the controlled-environment facility secure communication platform and/or the controlled-environment facility communication and/or media device to save a recording of at the least a portion of the electronic communication, by the controlled-environment facility secure communication platform program instructions, in response to selection, by the resident of the option to record the at least a portion of the electronic communication by the resident, via the user interface provided on the controlled-environment facility communication and/or media device.

7. The system of claim 1, wherein the electronic communication is a video visitation and the program instructions of the controlled-environment facility secure communication platform and/or the controlled-environment facility communication and/or media device further cause the controlled-environment facility secure communication platform and/or the controlled-environment facility communication and/or media device to present the option to the controlled-environment facility resident to record at least a portion of the video visitation by presenting, via the user interface provided on the controlled-environment facility communication and/or media device, one option to record the video of the video visitation, including audio of the video visitation, and/or another option to record an audio portion of the video visitation, alone, based, at least in part on further confirming that the resident is authorized to record the video audio and/or audio of the at least a portion of the electronic communication.

8. A method for providing on-demand recording of a controlled-environment facility resident electronic communication by the controlled-environment facility resident, the method comprising:
- accepting, by a controlled-environment facility secure communication platform, initiation of an electronic communication involving a resident of a controlled-environment facility;
- determining, by the controlled-environment facility secure communication platform and/or a controlled-environment facility administration and management system, whether the resident is authorized to participate in the electronic communication;
- establishing, by the controlled-environment facility secure communication platform, in response to a determination that the resident is authorized to participate in the electronic communication, an electronic communication link between the controlled-environment facility resident and another call party, via a user interface provided on a controlled-environment facility communication and/or media device;
- determining, by the controlled-environment facility secure communication platform and/or the controlled-environment facility administration and management system, whether the resident is authorized to record at least a portion of the electronic communication; and
- presenting, via the user interface provided on the controlled-environment facility communication and/or media device, in response to a determination that the resident is authorized to record at least a portion of the electronic communication, an option to the controlled-environment facility resident to record at least a portion of the electronic communication.

9. The method of claim 8, wherein the electronic communication is an audio communication and selection of the option to record the electronic communication results in recording audio of the at least a portion of the electronic communication.

10. The method of claim 8, wherein the electronic communication is a video visitation and selection of the option to record the electronic communication results in recording video of the at least a portion of the electronic communication.

11. The method of claim 8, wherein the electronic communication is a video visitation and wherein presenting the option to the controlled-environment facility resident to record at least a portion of the video visitation further comprises presenting, via the user interface provided on the controlled-environment facility communication and/or media device, one option to record the video of the video visitation, including audio of the video visitation, and another option to record an audio portion of the video visitation, alone.

12. The method of claim 8, wherein the option to record at least a portion of the electronic communication is presented, via the user interface provided on the controlled-environment facility communication and/or media device, prior to establishing the electronic communication link between the controlled-environment facility resident and the other call party.

13. The method of claim 8, further comprising saving a recording of at the least a portion of the electronic communication, by the controlled-environment facility secure communication platform in response to selection, by the resident of the option to record the at least a portion of the electronic communication by the resident, via the user interface provided on the controlled-environment facility communication and/or media device, for access by the resident, via the user interface provided on the controlled-environment facility communication and/or media device.

14. The method of claim 8, wherein the electronic communication is a video visitation and presenting the option to the controlled-environment facility resident to record at least a portion of the video visitation further comprises presenting, via the user interface provided on the controlled-environment facility communication and/or media device, one option to record the video of the video visitation, including audio of the video visitation, and/or another option to record an audio portion of the video visitation, alone, based, at least in part on further confirming that the resident is authorized to record the video audio and/or audio of the at least a portion of the electronic communication.

15. A tangible non-transitory computer-readable storage medium having program instructions stored thereon that, upon execution by one or more controlled-environment facility associated computer systems cause the one or more controlled-environment facility associated computer systems to:
   accept initiation of an electronic communication involving a resident of a controlled-environment facility;
   confirm that the resident is authorized to participate in the electronic communication;
   establish an electronic communication link between the controlled-environment facility resident and another call party in response to confirmation the resident is authorized to participate in the electronic communication;
   enable the resident to participate in the electronic communication, via a user interface provided on a controlled-environment facility communication and/or media device;
   confirm that the resident is authorized to record at least a portion of the electronic communication; and
   present, via the user interface provided on the controlled-environment facility communication and/or media device, in response to confirmation the resident is authorized to record at least a portion of the electronic communication, an option to the controlled-environment facility resident to record at least a portion of the electronic communication.

16. The tangible non-transitory computer-readable storage medium of claim 15, wherein execution of the program instructions further cause the one or more controlled-environment facility associated computer systems to present the option to the controlled-environment facility resident to record at least a portion of a video visitation further comprises presenting, via the user interface provided on the controlled-environment facility communication and/or media device, as one option to record the video of the video visitation, including audio of the video visitation, and another option to record an audio portion of the video visitation, alone.

17. The tangible non-transitory computer-readable storage medium of claim 15, wherein execution of the program instructions further cause the one or more controlled-environment facility associated computer systems to present the option to the controlled-environment facility resident to record at least a portion of a video visitation by presenting, via the user interface provided on the controlled-environment facility communication and/or media device, one option to record the video of the video visitation, including audio of the video visitation, and/or another option to record an audio portion of the video visitation, alone, based, at least in part on further confirming that the resident is authorized to record the video audio and/or audio of the at least a portion of the electronic communication.

\* \* \* \* \*